TRANSISTOR TEST CIRCUIT FOR NONDESTRUCTIVELY DETERMINING SECOND BREAKDOWN

Filed Jan. 6, 1969

INVENTOR,
JOHN W. LUNDEN.

BY: Harry M. Saragovitz, Edward J. Kelly, Herbert Berl & Julian C. Keppler
ATTORNEYS

United States Patent Office 3,535,639
Patented Oct. 20, 1970

3,535,639

TRANSISTOR TEST CIRCUIT FOR NONDESTRUCTIVELY DETERMINING SECOND BREAKDOWN

John W. Lunden, Camillus, N.Y., assignor, by mesne assignments, to the United States of America as represented by the Secretary of the Army

Filed Jan. 6, 1969, Ser. No. 789,224
Int. Cl. G01r *31/22*
U.S. Cl. 324—158 12 Claims

ABSTRACT OF THE DISCLOSURE

A test circuit for nondestructive determination of the second breakdown of transistors. The transistor under test is pulsed at its emitter and collector simultaneously but the collector voltage is increased until second breakdown is observed on an oscilloscope. The transistor is protected by a circuit which senses the initiation of second breakdown and clamps the collector to ground approximately one microsecond later.

BACKGROUND OF INVENTION

The present invention relates generally to transistor test circuits and in particular to a test circuit which will determine the loci of second breakdown in a transistor without destruction of said transistor.

Second breakdown has been found to be a limiting factor which must be considered in the design of high level transistor circuits. It is basically a voltage current instability and a phenomenon for which, at some high level of operation, the collector circuit current of a transistor suddenly increases to a large value with a simultaneous decrease of collector voltage. This action can also be interpreted as a sudden change in the output impedance of the transistor from a large positive value to a large negative value and then to a final small positive value. It is generally agreed that second breakdown is a thermal action not dependent upon a single circuit parameter for its initiation. The action is associated with a sudden concentration of current into a small area of the device. This results in a very high localized power dissipation which allows the junctions to degenerate forming a high conductance path between collector and emitter.

In the past, second breakdown has generally been considered necessarily catastrophic and for the most part, tests to determine safe operating regions have employed destructive measuring techniques. This is a gross disadvantage where the transistors of interest are relatively few in number and expensive in cost.

SUMMARY OF THE INVENTION

The general purpose of the invention is to provide a transistor test circuit for second breakdown which does not destroy the transistor itself. To accomplish this utilization has been made of two major observations. (a) Second breakdown is not necessarily catastrophic to the device. There exists a definite time delay between initiation of second breakdown and failure of transistor. (b) The junction temperature response lags (in time) the power function, hence any type of pulsed operation reduces the degree of limitation that second breakdown imposes on high power operation. These phenomena are utilized by a circuit in which the collector voltage of the test transistor is increased until second breakdown is reached and which then immediately clamps the collector to ground to avoid destruction. The breakdown points for various current levels are observed on an oscilloscope and plotted as a loci.

DESCRIPTION OF DRAWING

The exact nature of the invention will be readily apparent from consideration of the following specification relating to the annexed drawings in which.

DESCRIPTION OF THE PREFERRED EMBODIMENTS

Figure 1:
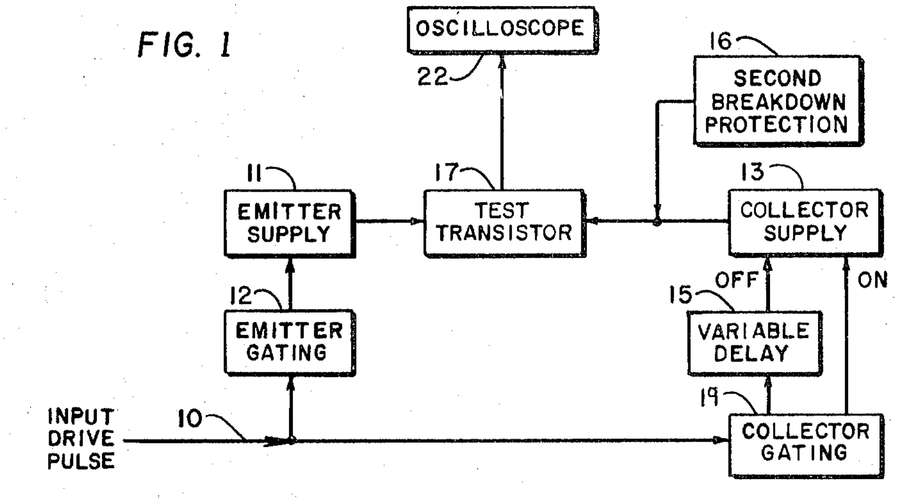
FIG. 1 is a block diagram of the test circuit.
Figure 2:
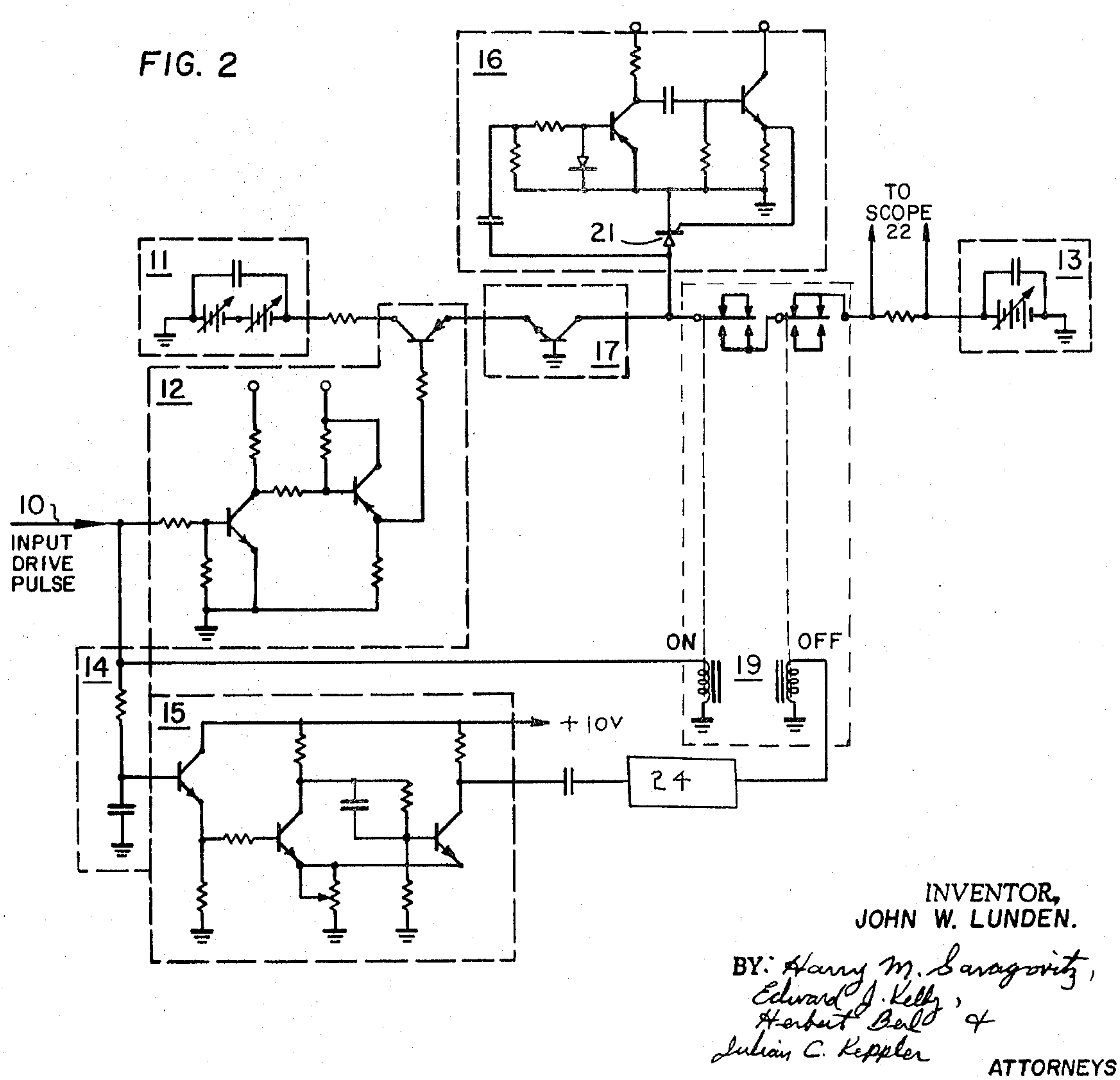
FIG. 2 is a full schematic diagram of the circuit used to determine the second breakdown trigger loci of a transistor.

Referring now to the drawings, wherein like reference characters designate like or corresponding parts in the two views, there are shown current sources 11 and 13 which are used to supply power to the emitter and collector respectively of test transistor 17. An input drive pulse 10 is fed to gate circuit 19 to supply a square pulse of voltage of adjustable width and PRF to the collector of the test transistor. The collector current is obtained by simultaneously pulsing the emitter with the desired bias through gate circuit 12.

The amplitude of the collector voltage is increased (at a constant current level) until a breakdown is observed on the scope 22. The protection circuit 16 serves effectively to ground the collector of the transistor approximately one microsecond after the occurrence of second breakdown. This is accomplished by sensing the rapid fall of collector voltage and using this sense voltage to gate the silicon controlled rectifier 21. The SCR then remains a high conductance path from collector to ground until the collector supply is removed. One microsecond has been sufficiently fast to protect most transistors.

The complete locus is obtained by repeating the above process at a number of current levels. The delay circuit is necessary to accommodate the longer time constants present in power type transistors. This delay is variable up to 50 seconds enabling collector power pulses of 50 seconds duration. The variable delay is obtained by adjusting the threshold firing voltage of the Schmitt trigger circuit 15 which is being driven by the RC integrated gating pulse obtained by circuit 14. The Schmitt trigger supplies a pulse source 24 to activate the off or break relay and thereby cut off collector current.

It should be understood that the foregoing disclosure relates to only a preferred embodiment of the invention and that modifications may be made therein without departing from the scope of the invention as set forth in the appended claims. For instance, the circuit could function without the delay circuit when testing low power transistors.

I claim:

1. An electrical circuit for determining the second breakdown trigger loci of a test transistor comprising:

- an emitter current supply,
- a first normally open gating circuit connected between said emitter supply and the emitter of said transistor,
- a variable collector current supply,
- a second normally open gating circuit having first and second control inputs connected between said collector supply and the collector of said transistor,
- a variable time delay circuit having an input and an output, said output connected to the first control input of said second gating circuit to open said gating circuit after a selected time delay,
- a source of square wave pulses, the width of which can be varied, connected to said first gathing circuit and said second control input of said second gating circuit to simultaneously close said gating circuits for the duration of a pulse, and connected to the input of said delay circuit for starting said selected time delay, protective circuit means connected to the collector of said test transistor by grounding said collector to cut off conduction of said transistor approximately one microsecond after the occurrence of second breakdown, and means in circuit with the collector of said transistor for providing an output indicative of second breakdown.

2. The circuit of claim 1 in which said protective circuit means includes a silicon controlled rectifier.

3. The circuit of claim 1 in which said second gating circuit comprises a make relay connected to the second control input and a break relay connected to the first control input.

4. The circuit of claim 1 in which said delay circuit comprises a Schmitt trigger circuit and a pulse generator connected in series between the input and output of said delay circuit.

5. The circuit of claim 2 in which said second gating circuit comprises a make relay connected to the second control input and a break relay connected to the first control input.

6. The circuit of claim 2 in which said delay circuit comprises a Schmitt trigger circuit and a pulse generator connected in series between the input and output of said delay circuit.

7. The circuit of claim 3 in which said delay circuit comprises a Schmitt trigger circuit and a pulse generator connected in series between the input and output of said delay circuit.

8. The circuit of claim 7 in which said protective circuit means includes a silicon controlled rectifier.

9. An electrical circuit for determining the second breakdown trigger loci of a test transistor comprising:

an emitter current supply, a first normally open gating circuit including a transistor having its collector-emitter circuit connected in series between said emitter supply and the emitter of said transistor, a variable collector curent supply, a second normally open gating circuit including a relay having its contacts connected in series between said collector supply and the collector of said transistor, a source of square wave pulses the width of which can be varied, connected to said first and second gating circuits to simultaneously close said gating circuits for the duration of a pulse, protective circuit means connected to the collector of said test transistor by grounding said collector to cut off conduction of said transistor approximately one microsecond after the occurrence of second breakdown, and means in circuit with the collector of said transistor for providing an output indicative of second breakdown.

10. The circuit of claim 9 in which said protective circuit means includes a silicon controlled rectifier.

11. The circuit of claim 9 in which said second gating circuit consists of a mercury relay.

12. The circuit of claim 11 in which said protective circuit means includes a silicon controlled rectifier.

References Cited

UNITED STATES PATENTS

| | | | |
|---|---|---|---|
| 3,371,276 | 2/1968 | Schiff | 324—158 |
| 3,401,338 | 9/1968 | Bolvin | 324—158 |

RUDOLPH V. ROLINEC, Primary Examiner

E. L. STOLARUN, Assistant Examiner